US012638626B2

(12) United States Patent
Yang et al.

(10) Patent No.: US 12,638,626 B2
(45) Date of Patent: May 26, 2026

(54) OPTICAL FILTER AND OPTICAL SYSTEM

(71) Applicant: 3M INNOVATIVE PROPERTIES COMPANY, St. Paul, MN (US)

(72) Inventors: Zhaohui Yang, North Oaks, MN (US); Ryan T. Fabick, Shoreview, MN (US); Edward J. Kivel, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 758 days.

(21) Appl. No.: 17/777,307

(22) PCT Filed: Dec. 3, 2020

(86) PCT No.: PCT/IB2020/061447
§ 371 (c)(1),
(2) Date: May 17, 2022

(87) PCT Pub. No.: WO2021/116849
PCT Pub. Date: Jun. 17, 2021

(65) Prior Publication Data
US 2022/0397710 A1 Dec. 15, 2022

Related U.S. Application Data

(60) Provisional application No. 62/945,392, filed on Dec. 9, 2019.

(51) Int. Cl.
*G02B 5/28* (2006.01)
*G02B 5/22* (2006.01)
(52) U.S. Cl.
CPC ............... *G02B 5/287* (2013.01); *G02B 5/22* (2013.01)

(58) Field of Classification Search
CPC ...................................................... G02B 5/287
See application file for complete search history.

(56) References Cited

U.S. PATENT DOCUMENTS 6,531,230 B1 * 3/2003 Weber ..................... B32B 27/08
428/580
6,967,778 B1 11/2005 Wheatley et al.
(Continued)

FOREIGN PATENT DOCUMENTS

KR 101674036 B1 11/2016
KR 20170054731 A 5/2017
(Continued)

OTHER PUBLICATIONS

International Search Report for PCT International Application No. PCT/IB2020/061447, mailed on Feb. 16, 2021, 3 pages.

*Primary Examiner* — Edmond C Lau
(74) *Attorney, Agent, or Firm* — Clifton F. Richardson

(57) ABSTRACT

An optical filter has an average optical transmission of greater than about 50% in a visible wavelength range (e.g., wavelengths from about 420 nm to about 550 nm) and an optical density greater than about 1.5 in an infrared wavelength range (e.g., wavelengths from about 650 nm to about 800 nm). The optical filter can have a sharp band edge between the visible and infrared ranges. For example, a change in percent transmission of at least about 30% can occur over a wavelength range not greater than about 10 nm wide and/or the slope of the band edge can be greater than about 5%/nm. An optical system includes the optical filter disposed between an emissive display and an optical sensor.

11 Claims, 8 Drawing Sheets

(56)     References Cited

U.S. PATENT DOCUMENTS

| | | | |
|---|---|---|---|
| 2001/0013668 | A1 | 8/2001 | Neavin et al. |
| 2003/0035972 | A1 | 2/2003 | Hanson |
| 2015/0378077 | A1 | 12/2015 | Haag et al. |
| 2018/0045860 | A1 | 2/2018 | Kawanishi et al. |
| 2018/0172888 | A1 | 6/2018 | Johnson et al. |

FOREIGN PATENT DOCUMENTS

| | | | |
|---|---|---|---|
| WO | 1999036257 | A1 | 7/1999 |
| WO | 2014110101 | A1 | 7/2014 |
| WO | 2018013363 | A1 | 1/2018 |
| WO | 2018163009 | A1 | 9/2018 |
| WO | 2019069214 | A2 | 4/2019 |

* cited by examiner

OPTICAL FILTER AND OPTICAL SYSTEM

CROSS REFERENCE TO RELATED APPLICATIONS

This application is a national stage filing under 35 U.S.C. 371 of PCT/IB2020/061447, filed Dec. 3, 2020, which claims the benefit of Provisional Application No. 62/945, 392, filed Dec. 9, 2019, the disclosures of which are incorporated by reference in their entirety herein.

BACKGROUND

Optical films can include alternating polymeric layers and can be used to transmit or reflect light in desired wavelength ranges.

A display system can include a fingerprint sensor behind a display panel.

SUMMARY

The present description relates to optical filters and optical systems including optical filters. An optical filter can have an average optical transmission of greater than about 50% in a visible wavelength range (e.g., wavelengths from about 420 nm to about 550 nm) and an optical density greater than about 1.5 in an infrared wavelength range (e.g., wavelengths from about 650 nm to about 800 nm). In some cases, a high optical density (e.g., greater than about 1.5, or greater than about 2) is achieved with a low total average thickness (e.g., no more than about 60 micrometers). The optical filter can have a sharp band edge between the visible and infrared ranges (e.g., a change in percent transmission of at least about 30% can occur over a wavelength range not greater than about 10 nm wide and/or the slope of the band edge can be greater than about 5%/nm). An optical filter can be an optical stack including a first optical filter disposed on a second optical filter. For example, the first optical filter can include alternating polymeric layers while the second optical filter can include dye(s) and/or pigment(s) to provide an absorption peak. Alternatively, or in addition, dye(s) and/or pigment(s) can be incorporated into one or more of the alternating polymeric layers to provide an absorption peak. An optical system can include the optical filter disposed between an emissive display and an optical sensor. For example, the optical system can be an organic light emitting diode (OLED) display system, the optical sensor can be an optical fingerprint detector, and the optical filter can be configured to pass visible light (e.g., substantially transmitting wavelengths at least in a range of 450 nm to 550 nm) to the fingerprint detector while blocking near-infrared (e.g., substantially blocking wavelengths at least in a range of 650 nm to 800 nm) ambient light. It has been found that the optical filter significantly improves the signal to noise ratio of the sensor. These and other aspects will be apparent from the following detailed description. In no event, however, should this brief summary be construed to limit the claimable subject matter.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Optical filters according to some embodiments of the present description can have a high transmission (e.g., at least 50%, or at least 70%) in a visible wavelength range (e.g., 420 nm or 450 nm to 550 nm or to 560 nm); a high optical density (e.g., greater than about 1.5, or greater than about 2), or a low optical transmission (e.g., less than about 5%, or less than about 1%, or less than about 0.6%), in an infrared wavelength range (e.g., about 650 nm to about 800 nm); and a sharp transition between the high and low transmission ranges (e.g., a change in percent transmission of at least 30% over a range not greater than about 10 nm and/or a slope greater than about 5%/nm). In some cases, these optical properties are achieved with a thin optical filter (e.g., no more than about 60 micrometers thick). The optical filter can be used to increase a signal to noise ratio in an optical system including an optical sensor behind an emissive display, for example.

An optical filter can include a multilayer optical film that includes a plurality of alternating polymeric layers. As is known in the art, multilayer optical films including alternating polymeric layers can be used to provide desired reflection and transmission bands by suitable selection of layer thickness. Multilayer optical films and methods of making multilayer optical films are described in U.S. Pat. No. 5,882,774 (Jonza et al.); U.S. Pat. No. 6,179,948 (Merrill et al.); U.S. Pat. No. 6,783,349 (Neavin et al.); U.S. Pat. No. 6,967,778 (Wheatley et al.); and U.S. Pat. No. 9,162,406 (Neavin et al.), for example.

Figure 1:
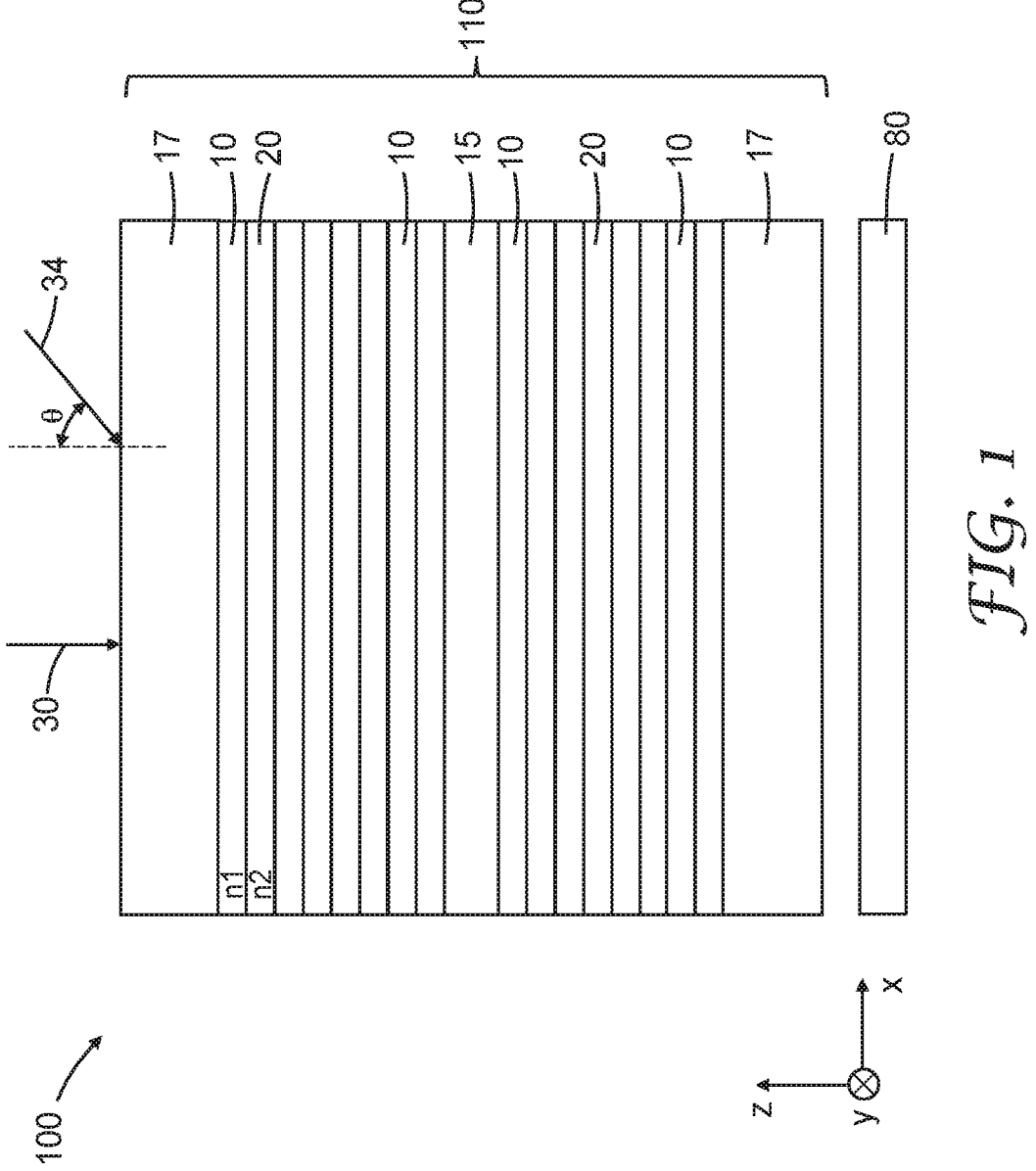
FIG. 1 is a schematic cross-sectional view of an optical filter.

FIG. 1 is a schematic cross-sectional view of an optical filter 100 including a plurality of alternating first and second polymeric layers 10 and 20. The optical filter can have many more layers than schematically illustrated in FIG. 1. The first and second polymeric layers typically number at least 50 in total (e.g., 50 to 600 layers in total, or 100 to 500 layers in total). Each first and second polymeric layer can have an average thickness (mean over the layer of the thickness) less than about 500 nm or less than about 400 nm. The optical filter 100 can further include thicker (e.g., greater than about 1 micrometer) layers 15 and/or 17 which can be included as protective boundary layers between packets or stacks of alternating polymeric layers or as outer protective skin layers. In some embodiments, the optical filter 100 includes a first optical filter 110 and a second optical filter 80. The second optical filter 80 can be disposed on the first optical filter 110 (e.g., directly or indirectly through one or more additional layers such as an adhesive layer). The second optical filter 80 can optionally be omitted. In embodiments where the second optical filter 80 is included and disposed on the first optical filter 110, the optical filter 100 may be referred to as an optical stack. In some such cases, FIG. 1 may be described as a schematic partially exploded view where the second optical filter 80 is shown spaced apart from the first optical filter 110 for ease of illustration.

The optical filter 110 may reflect and transmit light primarily by optical interference while the optical filter 80 may include one or more absorption bands. For example, the optical filter 110 may have a reflection band having left (lower wavelength) and right (higher wavelength) band edges and the optical filter 80 may include an absorption band near the left band edge, and/or include an absorption band near the right band edge, to mitigate the shift in the band edge(s) for obliquely incident light. The optical filter 80 can include dye(s) and/or pigment(s) dispersed in a polymer film or in a coating, for example.

In cases where it is desired to include one or more absorption bands, the absorption band(s) can be provided using layers of the first optical filter 110 instead of, or in addition to, including the second optical filter 80 (e.g., the first optical filter 110 can provide a first absorption band and the second optical filter 80 can provide a different second absorption band). For example, in some embodiments, at least one layer in the plurality of alternating first and second polymeric layers 10 and 20 has an absorption peak (e.g., at a peak absorption wavelength of an absorption band). As another example, in some embodiments, at least one of the layers 15 and/or 17 has an absorption peak. Any suitable dye(s) and/or pigment(s) can be used to provide the absorption peak(s). For example, the dyes described in U.S. Pat. Appl. Pub. Nos. 2015/0378077 (Haag et al.) and 2018/0172888 (Johnson et al.), can be used.

Figure 2:
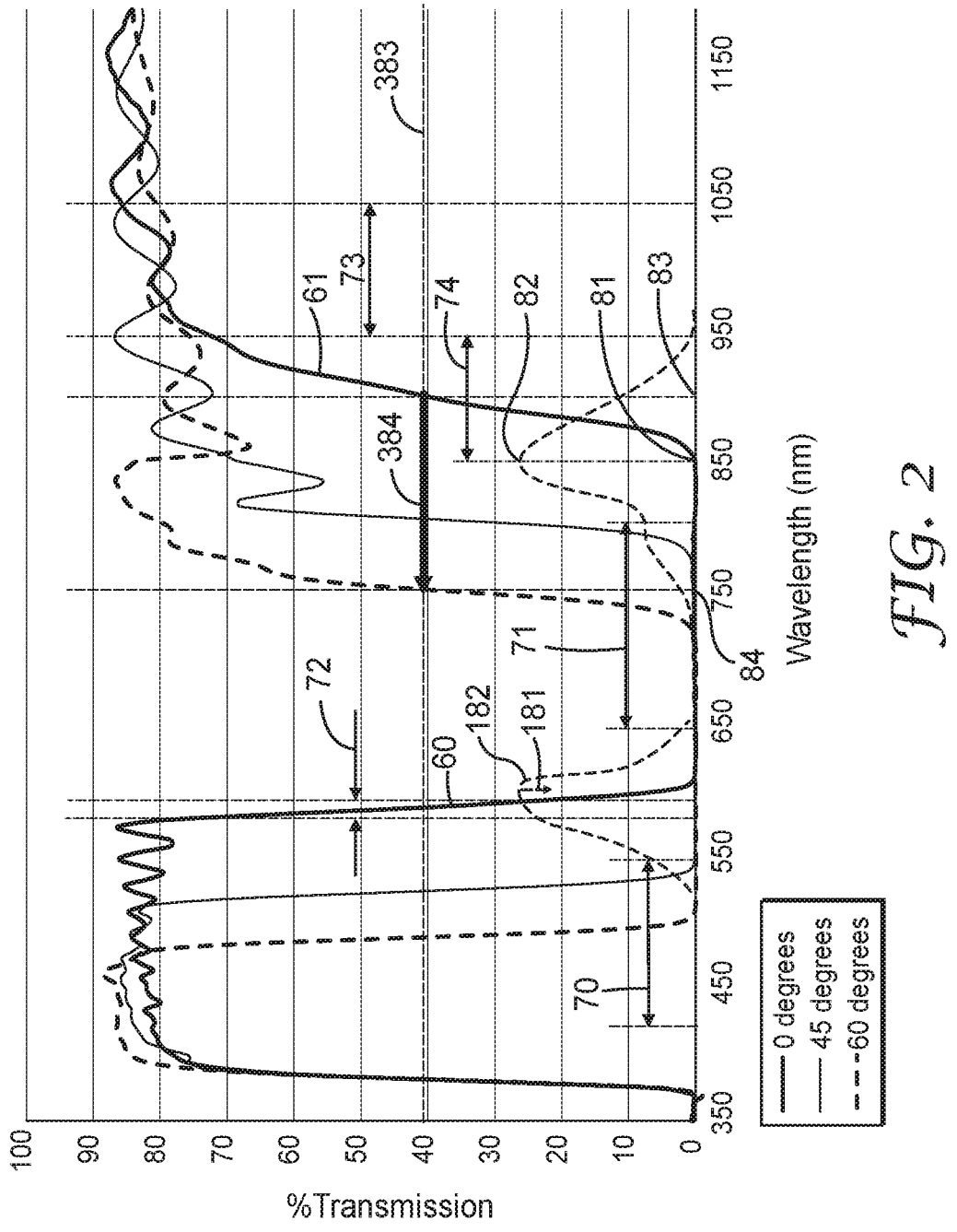
FIGS. 2-3 are plots of the transmission spectra for optical filters.
Figure 3:
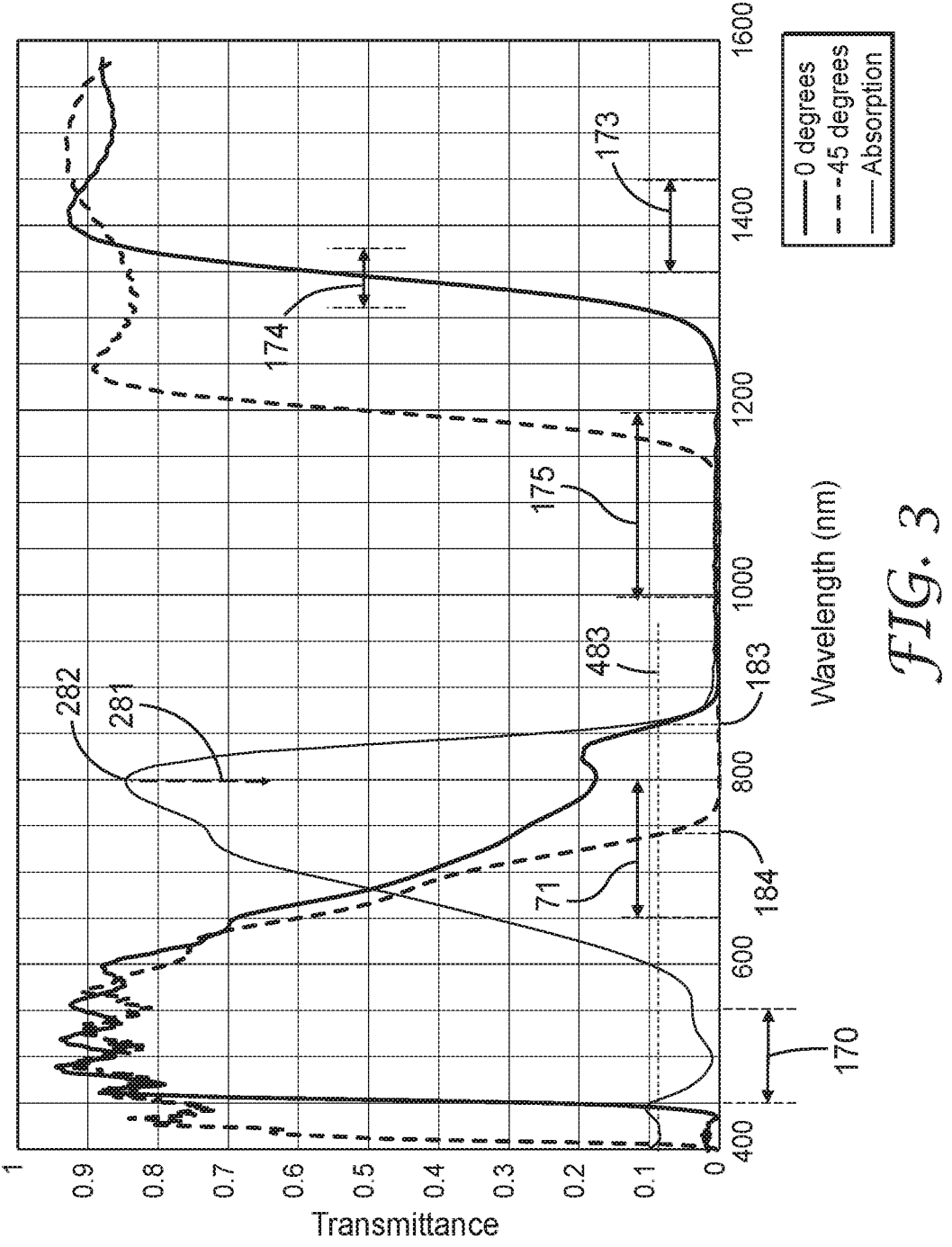

FIGS. 2-3 are plots of the transmission spectra for optical filters according to some embodiments. FIG. 2 shows the percent transmission for angles of incidence of 0, 45 and 60 degrees for an optical filter according to some embodiments. FIG. 3 show the transmittance (transmission expressed as a fraction) for angles of incidence of 0, 45 and 60 degrees for another optical filter according to some embodiments. The transmission can be described for a visible range (e.g., 70 or 170) which can be from about 400 nm or about 420 nm or about 450 nm to at least about 550 nm, for example; for a (near) infrared range (e.g., 71) which can be from about 650 nm to at least about 800 nm, for example; and for a far infrared range (e.g., 73 or 173). The far infrared range can be at least about 100 nm wide and can be disposed such that the near infrared wavelength range is between the visible and far infrared wavelength ranges. The far infrared range can be from about 950 nm to at least about 1050 nm, for example. The term infrared range, as used herein, refers to a wavelength range that includes infrared wavelengths and that can optionally include wavelengths down to about 650 nm. The terms near and far infrared wavelength ranges, as used herein, refer to relatively lower wavelength and relatively higher wavelength infrared ranges, respectively. The far infrared wavelength range may be disposed below 2000 nm or below 1500 nm, for example.

In some embodiments, an optical filter 100 includes a plurality of alternating first (10) and second (20) polymeric layers numbering at least 50 in total where each polymeric layer has an average thickness less than about 500 nm, such that for substantially normally incident (e.g., incident within 30 degrees, or 20 degrees, or 10 degrees of normal, or nominally normally incident) light 30 and for a visible wavelength range 70 extending from about 420 nm to about 550 nm and an infrared wavelength range 71 extending from about 650 nm to about 800 nm and for each of first (e.g., polarized along the x-axis) and second (e.g., polarized along the y-axis) orthogonal polarization states: the first polymeric layers 10 have a greater index of refraction (e.g., index n1) than the second polymeric layers 20 (e.g., index n2) for at least one visible wavelength in the visible wavelength range 70; an average optical transmission of the optical filter 100 in the visible wavelength range 70 is greater than about 50%; the optical filter 100 has an optical density greater than about 1.5 in the infrared wavelength range 71; and a transmission of the optical filter 100 changes by at least about 30% over a first wavelength range 72 not greater than about 10 nm wide and disposed between the visible (70) and infrared (71) wavelength ranges. A change in transmission by at least 30%, for example, can mean that $T1-T2 \geq 30\%$ when T1 and T2 are transmissions at two different wavelengths expressed as a percent (see, e.g., FIG. 2), or $T1-T2 \geq 0.3$ when T1, T2 are transmittances at two different wavelengths expressed as a fraction (see, e.g., FIG. 3). In some embodiments, for substantially normally incident light 30, the average optical transmission of the optical filter 100 in the visible wavelength range 70 is greater than about 60%, or greater than about 70%, or greater than about 80%. In some embodiments, the first wavelength range 72 is not greater than about 8 nm wide. The first wavelength range 72 can be about 1 nm to about 10 nm wide, or about 2 nm to about 8 nm wide, for example.

The index of refraction for a polarization state is the index of refraction along the direction of the electric field associated with the polarization state. For example, for normally incident light polarized along the x-axis, the index of refraction for the polarization state is the index along the x-axis. In some embodiments, for at least one visible wavelength in the visible wavelength range 70, the first polymeric layers 10 have a refractive index n1x along the x-axis and a refractive index n1y along the y-axis and the second polymeric layers 20 have a refractive index n2x along the x-axis and a refractive index n2y along the y-axis. In some embodiments, $n1x-n2x>0.05$ and $n1y-n2y>0.05$. In some embodiments, the first polymeric layers 10 are birefringent. For example, the first polymeric layers 10 can be biaxially oriented such that $n1x \approx n1y > n1z$ where n1z is the refractive index of the first polymeric layers 10 in the thickness direction (z-direction) for the at least one visible wavelength. In some embodiments, $\frac{1}{2}(n1x+n1y)-n1z>0.05$. In some embodiments, the second polymeric layers 20 are substantially isotropic such that $n2x \approx n2y \approx n2z$ where n2z is the refractive index of the second polymeric layers 20 in the thickness direction (z-direction) for the at least one visible wavelength. In some embodiments, the first polymeric layers 10 are birefringent and the second polymeric layers 20 are substantially isotropic.

Figure 4:
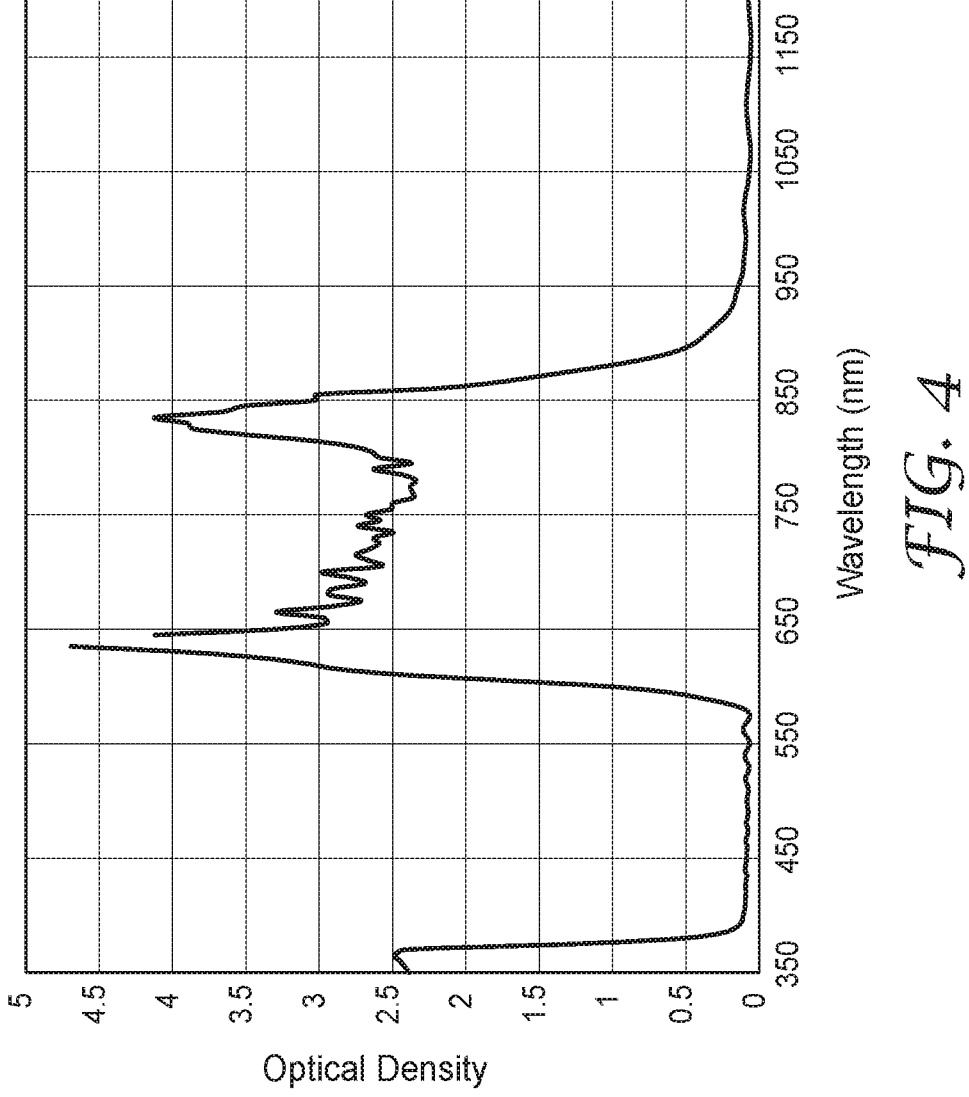
FIG. 4 is a plot of the optical density of an optical filter.

The optical density is the base 10 logarithm of the intensity of light incident on the optical filter divided by the intensity of the transmitted light. FIG. 4 is a plot of the optical density corresponding to the normal incidence transmission illustrated in FIG. 2. In some embodiments, the optical density of the optical filter is greater than about 1.5, or greater than about 2, or greater than about 2.2, or greater than about 2.4 in a wavelength range (e.g., the near infrared wavelength range 71). The wavelength range can extend from about 650 nm to about 800 nm, to at least about 800 nm, or to at least about 850 nm (e.g., to about 850 nm or to about 900 nm), for example. The optical density can be in any of these ranges throughout the wavelength range or the average optical density in the wavelength range can be in any of these ranges. In some embodiments, the optical filter has an average optical transmission of less than about 5%, or less than about 2%, or less than about 1%, or less than about 0.6% in a wavelength range extending from about 650 nm to at least about 800 nm or to at least about 850 nm.

In some embodiments, the optical filter 100, or the first optical filter 110, has an average thickness (mean thickness along z-direction over an area of the filter) of no more than about 100, 80, 70, 60, 50, or 40 micrometers. For example, the average thickness can be no more than about 60 micrometers, or between about 20 micrometers and about 60 micrometers. A relatively thin (e.g., no more than about 40 micrometers thick) optical filter that also has a desired optical density (e.g., greater than about 1.5) can be made using polyethylene naphthalate (PEN) as the higher index layers and polymethylmethacrylate (PMMA) as the lower index layer. This provides a relative high difference between the refractive indices of the higher and lower index layers which allows a high optical density to be achieved with a thin film. A thin optical filter is desired in some applications such as display applications where a thin display may be desired.

The optical filter can have one or more absorption peaks or can be substantially free of absorption peaks. In some embodiments, at least one layer in the plurality of alternating first and second polymeric layers has an absorption peak (e.g., 82 or 282) in a wavelength range of about 600 nm to about 900 nm, or about 700 nm to about 900 nm. For example, dye(s) and/or pigment(s) can be incorporated into one or both of the first or second layers to provide an absorption peak. In some embodiments, the transmission of the optical filter changes by at least about 30% over a second wavelength range (e.g., 74 or 174) not greater than about 100 nm wide, where the infrared wavelength range is disposed between the first and second wavelength ranges or between the visible and second wavelength ranges. In some embodiments, at least one layer in the plurality of alternating first and second polymeric layers 10 and 20 has a first absorption peak 182 at a wavelength closer to the first wavelength range 72 (e.g., in some cases, the first absorption peak 182 can be in the first wavelength range 72) than to the second wavelength range 74. In some embodiments, at least one layer in the plurality of alternating first and second polymeric layers 10 and 20 has a second absorption peak 82 at a wavelength closer to the second wavelength range 74 (e.g., in some cases, the second absorption peak 82 can be in the second wavelength range 74) than to the first wavelength range 72.

The optical filter whose transmission spectrum is shown FIG. 2 was formed similarly to that of Example 1 described elsewhere herein. The transmission spectrum of FIG. 3 was calculated using conventional optical modeling techniques where a dye dispersion was included in the higher index layers of the alternating polymeric layers to provide the absorption peak 282.

Figure 5:
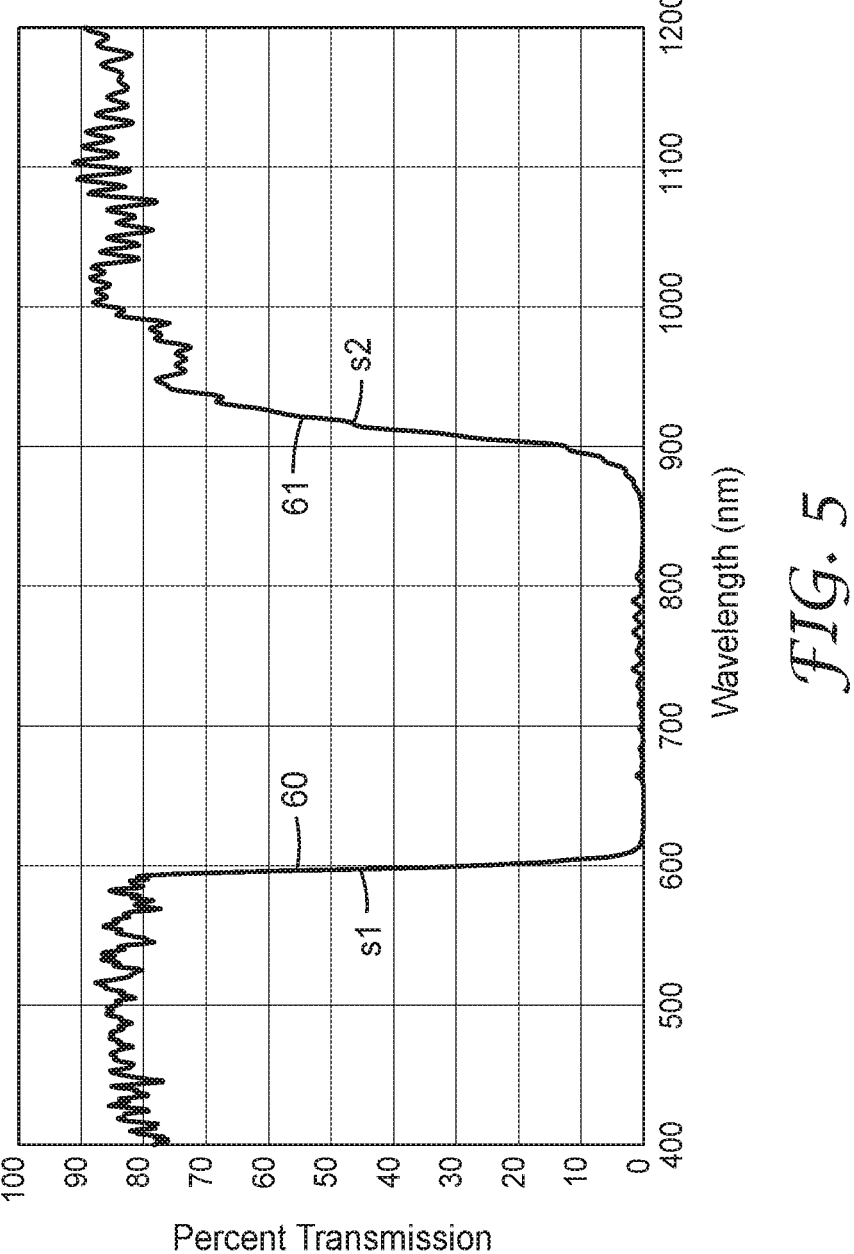
FIG. 5 is a plot of the transmission spectrum of the optical filter of Example 1.

In some embodiments, the optical filter has a sharp left band edge. In some embodiments, the optical filter has a sharp right band edge. The band edges can be sharpened by suitable selection of the layer thickness profile of the alternating polymeric layers. Optical films having sharp band edges are known in the art and are described in U.S. Pat. No. 6,967,778 (Wheatley et al.), for example. FIG. 5 is a of the transmission spectrum for an optical filter according to some embodiments where first and second band edges 60 and 61 have slopes schematically represented by s1 and s2, respectively, one or both of which can be greater than about 5%/nm or greater than about 7%. The slopes s1 and s2, as used herein, are positive quantities. In some embodiments, for substantially normally incident light 30, an optical transmission of the optical filter (e.g., 100 or 110) decreases from about 70% of an average optical transmittance of the optical filter in the visible wavelength range to about 20% of the average optical transmittance of the optical filter in the visible wavelength range with a slope s1 greater than about 5%/nm or greater than about 7%/nm. The slope can be determined from a linear least squares fit to the optical transmission versus wavelength in the range from about 70% of the average optical transmittance of the optical filter in the visible wavelength range to about 20% of the average optical transmittance of the optical filter in the visible wavelength range, for example. In some embodiments, for substantially normally incident light 30 and for a far infrared wavelength range (e.g., 73) extending from about 950 nm to at least about 1050 nm, the optical filter has a second band edge 61 between the near and far infrared wavelength ranges such that an optical transmission of the optical filter increases from about 20% of an average optical transmittance of the optical filter in the far infrared wavelength range to about 70% of the average optical transmittance of the optical filter 200 in the far infrared wavelength range with a slope s2 greater than about 5%/nm or greater than about 7%/nm.

In some embodiments, an optical stack 100 includes a first optical filter 110 and a second optical filter 80. The first optical filter 100 includes a plurality of alternating first (10) and second (20) polymeric layers numbering at least 50 in total, where each of the first and second polymeric layers can have an average thickness less than about 500 nm. For substantially normally incident light 30 and for a visible wavelength range 70 extending from about 420 nm to about 550 nm and an infrared wavelength range 71 extending from about 650 nm to about 800 nm and for at least a first polarization state (e.g., polarization along the x-axis and/or polarization along the y-axis), the first optical filter 110 has an average optical transmission of greater than about 50% in the visible wavelength range 70, an average optical reflection of greater than about 90% in the infrared wavelength range 71, and an optical reflection of greater than about 80% at a first wavelength (e.g., 81 or 181 or 281) greater than about 650 nm. The second optical filter 80 is disposed on the first optical filter 110 and includes a first peak absorption (e.g., 82 or 182 or 282) at the first wavelength 81 or 281. In some embodiments, the first wavelength is in a range of about 600 nm to about 900 nm, or about 700 nm to about 900 nm. In some embodiments, the second optical filter 80 further includes a second peak absorption (e.g., 82) at a wavelength (e.g., 81) at least 100 nm greater the first wavelength (e.g., 181). In some embodiments, for substantially normally incident light 30 and for at least the first polarization state, the average optical transmission is greater than about 60%, or greater than about 70%, or greater than about 80% in the visible wavelength range 70. In some embodiments, for substantially normally incident light 30 and for at least the first polarization state, the average optical reflection is greater than about 95% or greater than about 98% in the infrared wavelength range 71. In some embodiments, for substantially normally incident light 30 and for at least the first polarization state, the optical reflection is greater than about 90% at the first wavelength.

In some embodiments, an optical filter 110 includes a plurality of alternating first (10) and second (20) polymeric layers numbering at least 50 in total, where each polymeric layer can have an average thickness less than about 500 nm, such that for substantially normally incident light 30 and for a visible wavelength range 70 extending from about 420 nm to about 550 nm, a near infrared wavelength range 71 extending from about 650 nm to about 800 nm, a far infrared wavelength range 73 extending from about 950 nm to at least about 1050 nm, and for at least a first polarization state, the optical filter 110 has: an average optical transmission of greater than about 50% in each of the visible (70) and far infrared (73) wavelength ranges; an average optical transmission of less than about 5% in the near infrared wavelength range 71; and an optical transmission 383 at a first wavelength 83 between the near (71) and far (73) infrared wavelength ranges that is about 50% of the average optical transmission of the optical filter in the far infrared wavelength range. In some embodiments, at least one layer in the plurality of alternating first and second polymeric layers 10 and 20 has an absorption peak 82 at a second wavelength 81 between the near (71) and far (73) infrared wavelength ranges. In some embodiments, for light 34 incident on the optical filter 110 at an incident angle θ (angle relative to normal) of at least about 45 degrees, the first wavelength 83 shifts to a third wavelength 84 less than the second wavelength 81. In other words, at the incident angle θ, the wavelength where the optical transmission is equal to optical transmission 383 is shifted to the wavelength 84 as schematically represented by the arrow 384 for an incident angle of 60 degrees in FIG. 2. The incident angle θ can be about 45 degrees or about 60 degrees, for example. In some embodiments, for substantially normally incident light 30 and for at least the first polarization state, the average optical transmission is greater than about 60%, or greater than about 70%, or greater than about 80% in each of the visible (70) and far infrared (73) wavelength ranges. In some embodiments, for substantially normally incident light 30 and for at least the first polarization state, the average optical transmission is less than about 2%, or less than about 1%, or less than about 0.6% in the near infrared wavelength range 71.

In embodiment of FIG. 2, the average optical transmission in the visible wavelength range 70 is about 82.5%; the average optical transmission in the near infrared range 71 is about 0.2%; the average optical transmission in the far infrared range from about 950 nm to about 1050 nm is about 80%; the first wavelength 83 is about 900 nm; the second wavelength 81 is about 850 nm, and the third wavelength 84 is about 755 nm for an incident angle of about 60 degrees.

In some embodiments, an optical filter 110 includes a plurality of alternating first (10) and second (20) polymeric layers numbering at least 50 in total, where each polymeric layer can have an average thickness less than about 500 nm, such that for substantially normally incident light 30 and for a visible wavelength range 170 extending from about 450 nm to about 550 nm, a near infrared wavelength range 71 extending from about 650 nm to about 800 nm, a far infrared wavelength range 173 at least about 100 nm wide and disposed such that the near infrared wavelength range 71 is between the visible (170) and far (173) infrared wavelength ranges, and for at least a first polarization state, the optical filter 110 has: an average optical transmission of greater than about 75% in each of the visible and far infrared wavelength ranges; an average optical transmission of less than about 45% in the near infrared wavelength range; and an optical transmission at a first wavelength 183 between the near and far infrared wavelength ranges that is about 10% of the average optical transmission of the optical filter in the visible wavelength range. In some embodiments, at least one layer in the plurality of alternating first and second polymeric layers 10 and 20 has an absorption peak 282 at a second wavelength 281 in a range from about 650 nm to about 900 nm. In some embodiments, for light 34 incident on the optical filter 110 at an incident angle θ of at least about 45 degrees, the first wavelength shifts to a third wavelength 184 less than the second wavelength 281. In other words, at the incident angle θ, the wavelength where the optical transmittance is equal to optical transmittance 483 is shifted to the wavelength 184 as schematically illustrated in FIG. 3 for an incident angle of 45 degrees. The incident angle θ can be about 45 degrees or about 60 degrees, for example. In some embodiments, for substantially normally incident light 30 and for at least the first polarization state, the average optical transmission is greater than about 80% in each of the visible and far infrared wavelength ranges 170 and 173. In some embodiments, for substantially normally incident light 30 and for at least the first polarization state, the average optical transmission is less than about 40% or less than about 30% in the near infrared wavelength range 71.

In the embodiment of FIG. 3, the average optical transmission in the visible wavelength range 170 is about 85%; the average optical transmission in the near infrared range 71 is about 36.5%; the average optical transmission in the far infrared range from 1350 nm to 1450 nm is about 87%; the first wavelength 183 is about 860 nm; the second wavelength 281 is about 800 nm, and the third wavelength 184 is about 741 nm for an incident angle of about 45 degrees.

In some embodiments, the far infrared wavelength range extends to no more than about 2000 nm, or no more than about 1800 nm, or no more than about 1600 nm, or no more than about 1500 nm. In some embodiments, for substantially normally incident light and for at least a first polarization state, the optical filter 110 has an average optical transmission of less than about 5%, or less than about 2%, or less than about 1%, or less than about 0.6% in a second near infrared wavelength range 175 that is at least 100 nm wide and that is disposed between the near (71) and far (173) infrared wavelength ranges. For example, the second near infrared wavelength range can be from about 1000 nm to about 1200 nm. In the embodiment of FIG. 3, the average optical transmission in the second near infrared wavelength range 175 is about 0.5%.

In any embodiment where optical transmission, absorption, or reflection is described for at least one polarization state, the optical stack or optical filter can satisfy the stated condition(s) for one polarization state or for each of two orthogonal polarization states. For example, the reflection band(s) provided by the optical filter can be for one polarization state (e.g., a reflective polarizer) or for two orthogonal polarization states (e.g., a mirror).

In some embodiments, an optical system includes the optical filter 100 or the first optical filter 110. The optical system can be a display system that includes an emissive display (e.g., an OLED display), an optical sensor (e.g., a fingerprint sensor), and the optical filter disposed between the emissive display and the optical sensor.

Figure 6:
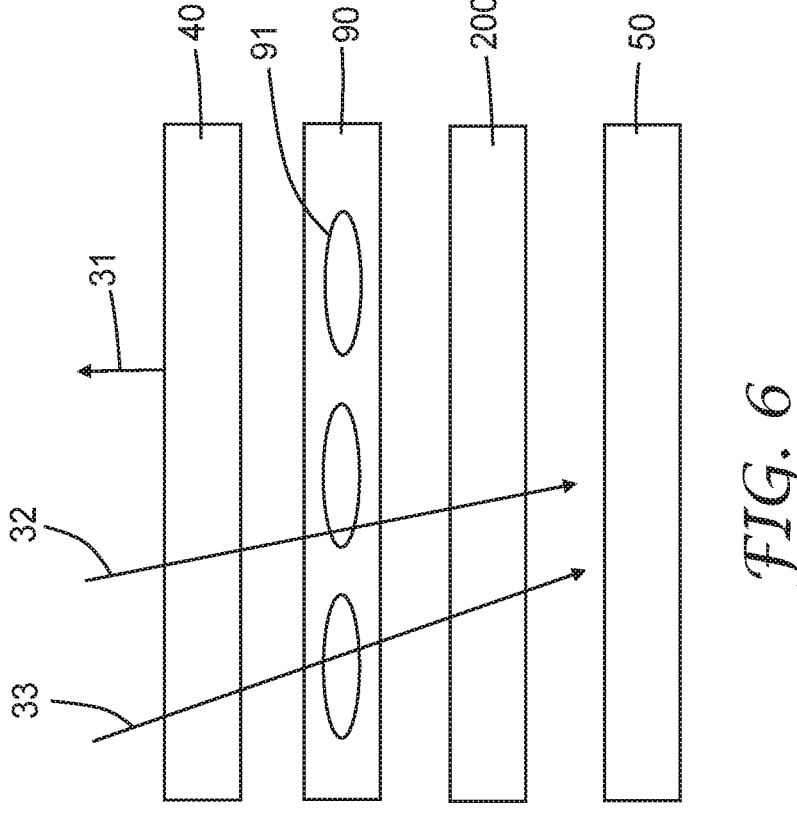
FIG. 6 is a schematic cross-sectional view of an optical system.

FIG. 6 is a schematic cross-sectional view of an optical system 300 including an emissive display 40 configured to emit a visible image 31 in a visible wavelength range (e.g., 70) that can extend at least from about 420 nm to about 550 nm; an optical sensor 50 configured to receive and sense through the emissive display 40, a first visible light 32 in the visible wavelength range and a second infrared light 33 in an infrared wavelength range (e.g., 71) extending at least from about 650 nm to about 800 nm. An optical filter 200 is disposed between the emissive display 40 and the optical sensor 50, such that for substantially normally incident light 30, the optical filter 200 has a first band edge 60 between the visible and infrared wavelength ranges 70 and 71 such that an optical transmission of the optical filter decreases from about 70% of an average optical transmittance of the optical filter 200 in the visible wavelength range 70 to about 20% of the average optical transmittance of the optical filter in the visible wavelength range 70 with a slope greater than about 5%/nm. The optical filter 200 can correspond to the optical filter 100 or the optical filter 110, for example. In some embodiments, the slope is greater than about 7%/nm. In some embodiments, the optical transmission of the optical filter 200 changes by at least about 30% over a first wavelength range (e.g., 72) not greater than about 10 nm wide or not greater than about 8 nm wide, where the first wavelength range is disposed between the visible and infrared wavelength ranges. In some embodiments, the optical system 300 further includes imaging optics 90 including at least a first lens 91 for imaging light incident on the emissive display 40 onto the optical sensor 50. The imaging optics 90 can include a plurality of microlenses such as those described in U.S. Pat. Appl. Pub. Nos. 2009/0179142 (Duparre et al.) and 2018/0045860 (Kawanishi et al.), for example.

In some embodiments, for substantially normally incident light 30 and for a far infrared wavelength range (e.g., 73) extending from about 950 nm to at least about 1050 nm, the optical filter 200 has a second band edge 61 between the near and far infrared wavelength ranges such that an optical transmission of the optical filter increases from about 20% of an average optical transmittance of the optical filter 200 in the far infrared wavelength range to about 70% of the average optical transmittance of the optical filter 200 in the far infrared wavelength range with a slope greater than about 5%/nm or greater than about 7%/nm.

EXAMPLES

Example 1

A multilayer optical film optical filter including alternating first and second layers was prepared by co-extrusion and biaxial orientation as described in U.S. Pat. Appl. Pub. No. 2001/0013668 (Neavin et al.), with exceptions as follows. The first layers were formed from polyethylene naphthalate (PEN) homopolymer (100 mol % naphthalene dicarboxylate with 100 mol % ethylene glycol) having a Tg of 121-123 degrees centigrade. The second layers were formed from poly(methyl methacrylate) or PMMA (PMMA having a Tg of 100 degrees centigrade is available from Arkema, Pasadena, TX, USA, for example). The PEN layers had a refractive index of about 1.75-1.8 at 550 nm and the PMMA layers had a refractive index of about 1.5 at 550 nm. The polymer used for the skin layers were formed from the same material used in the first layers.

Figure 7:
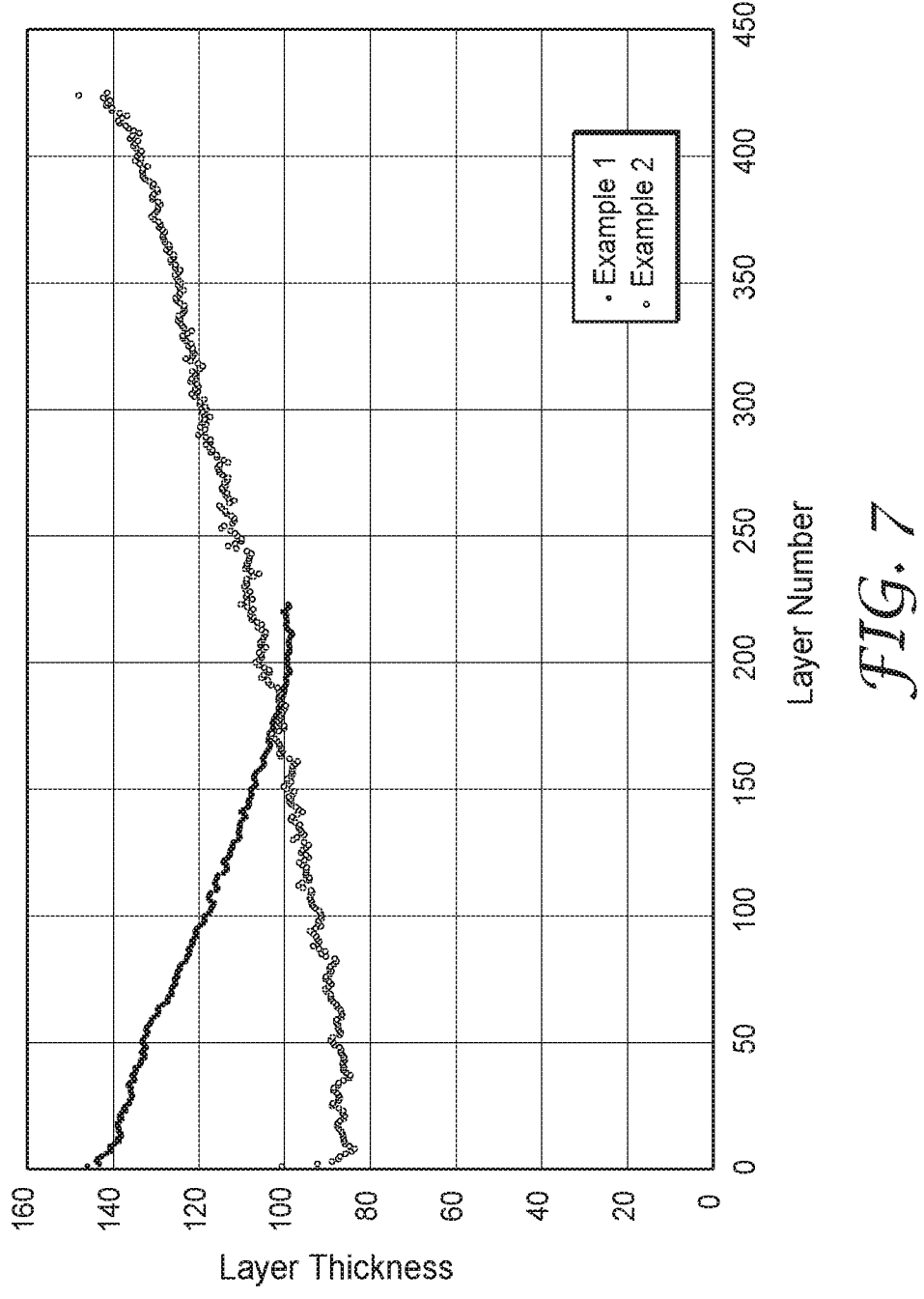
FIG. 7 is a plot of layer thicknesses of multilayer films.

The materials were fed from separate extruders to a multilayer coextrusion feedblock, in which they were assembled into alternating layers. The skin layers were added to the construction in a manifold specific to that purpose, resulting in a final construction having 227 layers. The multilayer melt was then cast through a film die onto a chill roll, in the conventional manner for polyester films, upon which it was quenched. The cast web was then stretched in a commercial scale biaxial tenter at temperatures and draw profiles similar to those described in U.S. Pat. Appl. Pub. No. 2001/0013668 (Neavin et al.). The layer thickness profile (thickness of layer versus layer number) was measured by atomic force microscopy and is shown in FIG. 7. The transmission spectrum for normally incident light is shown in FIG. 5. The film was measured for physical thickness by a capacitance gauge to be approximately 33 micrometers as measured using the Ono-Sokki DG-925 Micrometer.

Example 2

Figure 8:
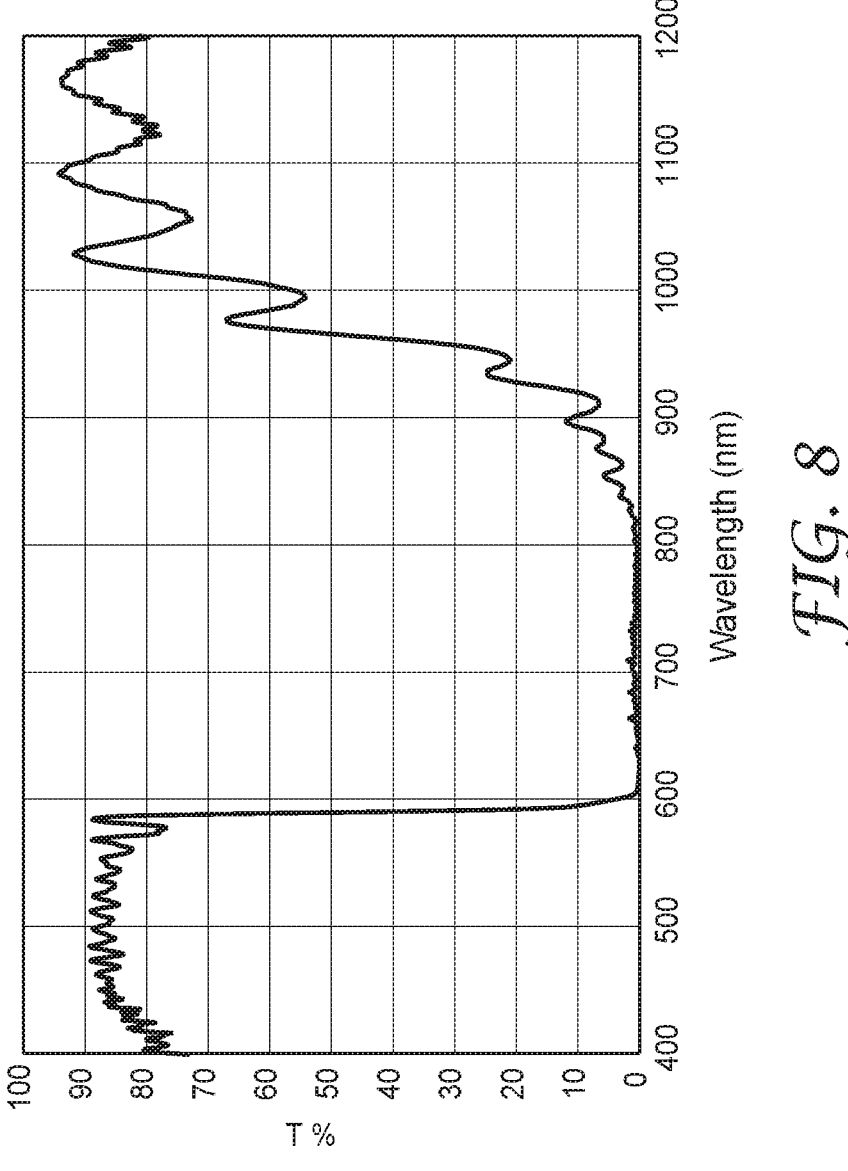
FIG. 8 is a plot of the transmission spectrum of the optical filter of Example 2.

A multilayer optical film optical filter was made as generally described for Example 1 except that polyethylene terephthalate (PET) was used for the high index layers (first layers), while PMMA was still used for the low index layers (second layers), and the film included 425 layers having a layer profile shown in FIG. 7. The PET layers had a refractive index of about 1.65-1.7 at 550 nm. The transmission spectrum for normally incident light is shown in FIG. 8. The film had a thickness of about 60 micrometers.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations, or variations, or combinations of the specific embodiments discussed herein. Therefore, it is intended that this disclosure be limited only by the claims and the equivalents thereof.

What is claimed is:

1. An optical filter comprising a plurality of alternating first and second polymeric layers numbering at least 50 in total, each polymeric layer having an average thickness less than about 500 nm, such that for substantially normally incident light and for a visible wavelength range extending from about 420 nm to about 550 nm and an infrared wavelength range extending from about 650 nm to about 800 nm and for each of first and second orthogonal polarization states:

the first polymeric layers have a greater index of refraction than the second polymeric layers for at least one visible wavelength in the visible wavelength range;

an average optical transmission of the optical filter in the visible wavelength range is greater than about 50%;

the optical filter has an optical density greater than about 2 throughout the infrared wavelength range; and a transmission of the optical filter changes by at least about 30% over a first wavelength range not greater than about 10 nm wide and disposed between the visible and infrared wavelength ranges, wherein at least one layer in the plurality of alternating first and second polymeric layers has a first absorption peak at a wavelength in a range of about 700 nm to about 900 nm.

2. The optical filter of claim 1, wherein the optical density of the optical filter is greater than about 1.5 throughout a wavelength range extending from about 650 nm to at least about 850 nm.

3. The optical filter of claim 1, wherein the optical density of the optical filter is greater than about 2 throughout a wavelength range extending from about 650 nm to at least about 850 nm.

4. The optical filter of claim 3 having an average thickness of no more than about 60 micrometers.

5. The optical filter of claim 1, wherein the first wavelength range is not greater than about 8 nm wide.

6. The optical filter of claim 1, wherein the transmission of the optical filter changes by at least about 30% over a second wavelength range not greater than about 100 nm wide, the infrared wavelength range being disposed between the first and second wavelength ranges.

7. The optical filter of claim 6, wherein at least one layer in the plurality of alternating first and second polymeric layers has a second absorption peak at a wavelength closer to the first wavelength range than to the second wavelength range.

8. The optical filter of claim 7, wherein the wavelength of the first absorption peak is closer to the second wavelength range than to the first wavelength range.

9. An optical stack comprising:

a first optical filter comprising a plurality of alternating first and second polymeric layers numbering at least 50 in total, each polymeric layer having an average thickness less than about 500 nm, such that for substantially normally incident light and for a visible wavelength range extending from about 420 nm to about 550 nm and an infrared wavelength range extending from about 650 nm to about 800 nm and for at least a first polarization state, the first optical filter has an average optical transmission of greater than about 50% in the visible wavelength range, an average optical reflection of greater than about 90% in the infrared wavelength range, and an optical reflection of greater than about 80% at a first wavelength in a range of about 700 nm to about 900 nm; and a second optical filter disposed on the first optical filter and comprising a peak absorption at the first wavelength, wherein the optical stack has an optical density greater than about 2 throughout the infrared wavelength range.

10. An optical filter comprising a plurality of alternating first and second polymeric layers numbering at least 50 in total, each polymeric layer having an average thickness less than about 500 nm, such that for substantially normally incident light and for a visible wavelength range extending from about 420 nm to about 550 nm, a near infrared wavelength range extending from about 650 nm to about 800 nm, a far infrared wavelength range extending from about 950 nm to at least about 1050 nm, and for at least a first polarization state, the optical filter has:

an average optical transmission of greater than about 50% in each of the visible and far infrared wavelength ranges;

an optical density greater than about 2 throughout the near infrared wavelength range; and an optical transmission at a first wavelength between the near and far infrared wavelength ranges that is about 50% of the average optical transmission of the optical filter in the far infrared wavelength range;

wherein at least one layer in the plurality of alternating first and second polymeric layers has an absorption peak at a second wavelength between the near and far infrared wavelength ranges, and wherein for light incident on the optical filter at an incident angle of at least about 45 degrees, the first wavelength shifts to a third wavelength less than the second wavelength.

11. An optical filter comprising a plurality of alternating first and second polymeric layers numbering at least 50 in total, each polymeric layer having an average thickness less than about 500 nm, such that for substantially normally incident light and for a visible wavelength range extending from about 450 nm to about 550 nm, a near infrared wavelength range extending from about 650 nm to about 800 nm, a far infrared wavelength range at least about 100 nm wide and disposed such that the near infrared wavelength range is between the visible and far infrared wavelength ranges, and for at least a first polarization state, the optical filter has:

an average optical transmission of greater than about 75% in each of the visible and far infrared wavelength ranges;

an optical density greater than about 2 throughout the near infrared wavelength range; and an optical transmission at a first wavelength between the near and far infrared wavelength ranges that is about 10% of the average optical transmission of the optical filter in the visible wavelength range;

wherein at least one layer in the plurality of alternating first and second polymeric layers has an absorption peak at a second wavelength in a range from about 700 nm to about 900 nm, and wherein for light incident on the optical filter at an incident angle of at least about 45 degrees, the first wavelength shifts to a third wavelength less than the second wavelength.

* * * * *